No. 734,772. Patented July 28, 1903.

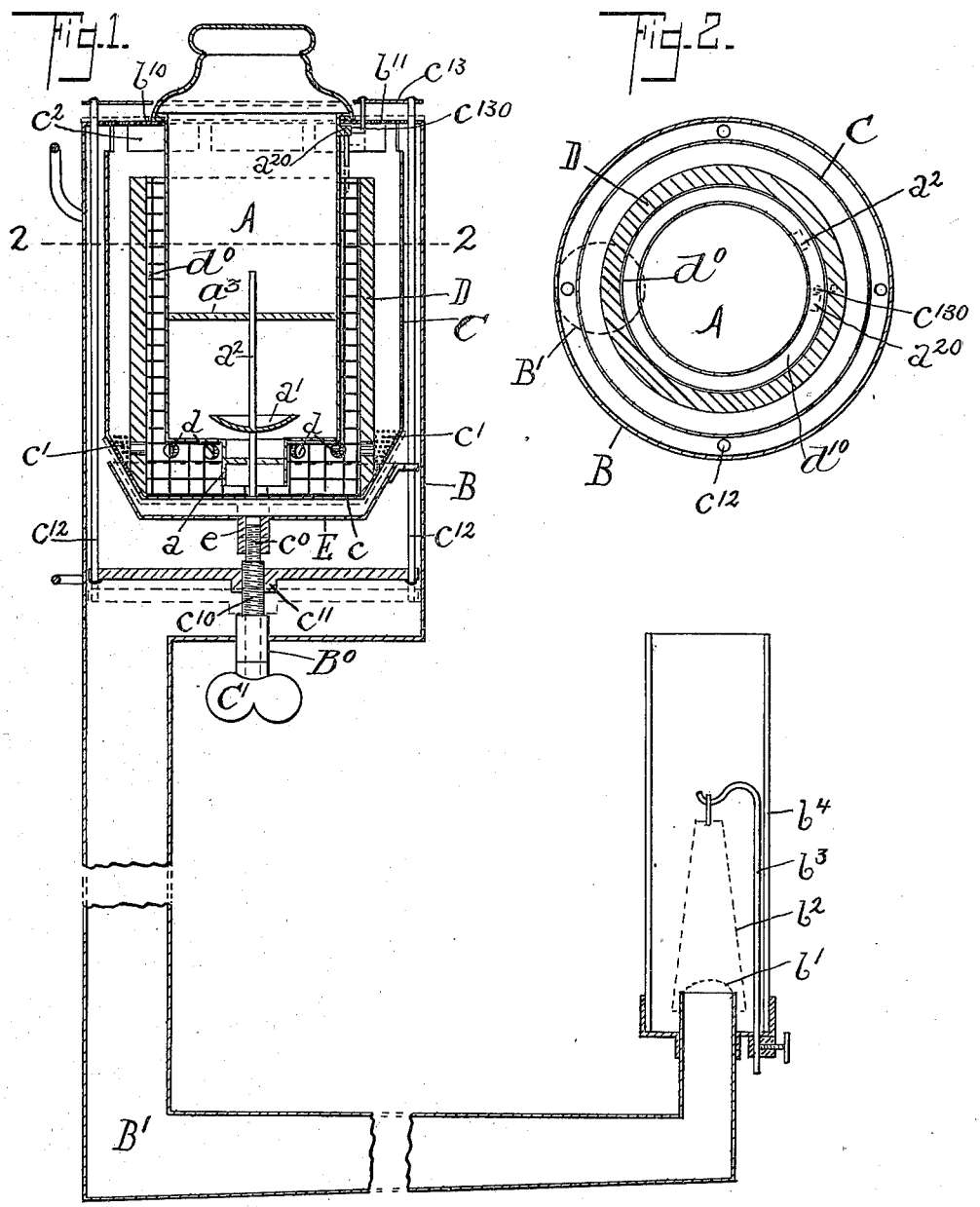

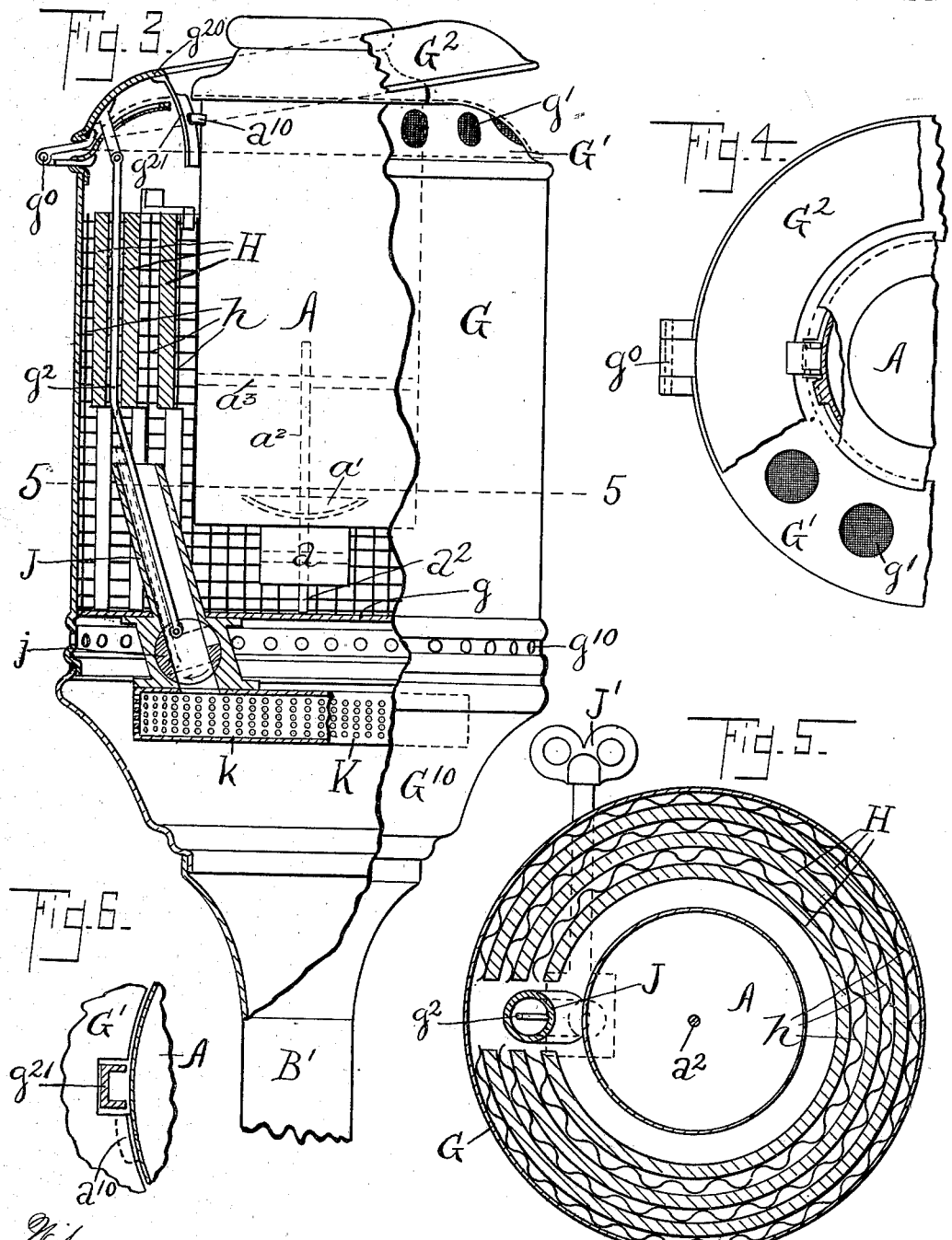

UNITED STATES PATENT OFFICE.

WALTER S. STROWGER, OF ROCHESTER, NEW YORK, ASSIGNOR TO STROWGER COMPANY, OF ROCHESTER, NEW YORK, A CORPORATION OF NEW YORK.

CARBURETING-LAMP.

SPECIFICATION forming part of Letters Patent No. 734,772, dated July 28, 1903.

Application filed December 20, 1899. Renewed January 9, 1903. Serial No. 138,435. (No model.)

*To all whom it may concern:*

Be it known that I, WALTER S. STROWGER, a citizen of the United States, and a resident of Rochester, in the county of Monroe and State of New York, have invented certain new and useful Improvements in Carbureting-Lamps, of which the following is a specification.

My invention relates to carbureting-lamps. Its purpose is to provide a mechanism adapted to produce a gas that will burn with a blue flame, thus showing a substantially complete combustion.

My invention consists in the devices and arrangements of parts hereinafter described.

In the drawings, Figure 1 is a vertical section through a carbureting-lamp embodying my invention. Fig. 2 is a cross-section on the line 2 2 of Fig. 1. Fig. 3 is an elevation of a portion of a device embodying my invention in another form, parts being broken away and parts being shown in vertical section. Fig. 4 is a partial top plan view of the device shown in Fig. 3, parts being broken away to exhibit construction. Fig. 5 is a cross-section on the line 5 5 of Fig. 3; and Fig. 6 is a detail view, a cross-section on that portion of the dotted line within the bracket marked 5, Fig. 3.

In the drawings, reference being had to Figs. 1 and 2, A is an ordinary self-feeding reservoir. such as is employed in what are known as "German" student-lamps and adapted to feed the contents of the reservoir into a vessel and to a definite height therein. It embodies a discharge-tube $a$ and valve $a'$ adapted to close the reservoir when the reservoir is lifted from its place, but in which the valve-stem $a^2$ is moved to open the valve when the reservoir is in place for feeding the contents therefrom. A guide $a^3$ for the valve-stem $a^2$ may be used.

B is an outer casing, in which the reservoir is supported, to the bottom of which is connected a feed-pipe B', leading to the burner $b'$. In the form of device shown the burner is a tube having a wire-gauze cap, on the outer surface of which the combustion of vapor occurs. In order to produce light, various forms of device may be employed, but a convenient form is shown in the drawings, consisting of an incandescible mantle $b^2$, supported over the burner $b'$, so as to be heated and made incandescent by the burning gas. $b^3$ is the support for said mantle, and $b^4$ is the chimney. The burner may of course be used for heating purposes only and may be embodied in a heater or stove for cooking or house-heating.

Within the outer casing B is an inner casing C, having an imperforate bottom $c$, and in the side of the inner casing, at a suitable height above the bottom, are a series of perforations $c'$. When oil is fed from the reservoir A, it passes into the bottom of the inner casing C, and the perforations $c'$ are set so far above said bottom that fluid will not flow out through the perforations. The perforations, however, may be quite close to the surface of the fluid. The casing C is hung from the annular top $b^{10}$ of the casing B and at such a distance from the side walls of the outer casing that air may pass freely down through the space thus formed. The reservoir A rests upon the annular top $b^{10}$ and is supported by it, and said annular top is perforated by a series of inlet air-holes $b^{11}$. Said holes are so placed as to permit the passage of air downward into the interior of the casing C and of the casing B, so that air flowing through the top of the casing B passes both into the casing C and outside it and downward.

In order that free movement of air may occur, there are a series of holes or perforations $c^2$ in the upper portion of the casing C, so that air may circulate freely therethrough.

Within the casing C is a vertically-arranged sheet D of absorbent material, which extends down to the bottom of the casing and is preferably made of fibrous asbestos. It may, however, be made of felt or wicking or other suitable material and of such height as to extend from out of the fluid to a height above the surface of the fluid such as to provide an ample evaporating-surface. It is preferably supported by means of the inner lining $d^0$ of wire-cloth. Through the lower portion of the sheet of absorbent D are a series of holes $d$, that are at such a height from the bottom of the casing that the oil flowing from the reservoir does not flow through the holes, but which are close to the surface of the oil. The reservoir A is set within the sheet of absorbent, leaving a space $d^{10}$, Fig. 2, between the reservoir and the absorbent. Consequently air which passes inward and downward into the casing C passes both inside the absorbent D and outside of the same and between it and the casing C.

The casing C is a mixer for air and gasolene-vapor, and the holes $c'$ constitute a connection between the casing C and the casing B.

Below the bottom of the casing C is a cap E of such size and shape as when fitted upon the lower end of the casing C to cover the series of perforations $c'$. This cap is operated by means of any suitable device, such as a thumb-screw C', supported in the collar $B^0$, connected to the casing B, and having a threaded end $C^0$ passing into a threaded projection $e$ upon the cap E, so that when the thumb-screw C' is turned in one direction the cap E is raised, the perforations C' are closed, and when the thumb-screw is turned in the other direction the cap is lowered and said perforations are opened. Upon the stem of the thumb-screw C' is another thread $c^{10}$, having a nut $c^{11}$ thereon. The thread on the end $C^0$ is of the reverse form to that of the thread $c^{10}$—that is to say, if the former thread is right-handed the latter is left-handed. Consequently when the thumb-screw C' is turned and the cap E is raised the nut $c^{11}$ will be lowered. To the nut $c^{11}$ are fastened a series of rods $c^{12}$, which connect with a flat cover $c^{13}$, set above the perforated top of the casing B, so that when the cover $c^{13}$ is lowered the perforations $b^{11}$ are closed, and when the said cover is raised said perforations are opened. Consequently upon turning the thumb-screw C' the perforations $c'$ in the casing C are closed, and at the same time by the same movement of the thumb-screw the perforations $b^{11}$ in the top of the outer casing are closed.

The reservoir A is attached by a kind of bayonet-catch to the top $b^{10}$ of the casing B, as follows: The reservoir A has a lug $a^{20}$ upon its outer surface, as shown in Fig. 2, and the inner edge of the tube $b^{10}$ of the outer casing B has a notch $a^2$, through which said lug may pass when the reservoir is inserted into place, and said lug is in such position as to lie closely under the under surface of the top $b^{10}$ when the reservoir A is slightly turned. To the cover $c^{13}$ is attached an arm $c^{130}$, which is in a position with reference to the notch in the top $b^{10}$ so that when the lug $a^{20}$ is turned slightly from registry with the notch $a^2$, through which it passes, the arm $c^{130}$ will be in position to be set between the lug $a^{20}$ and the notch $a^2$. The arm is of such a form that when the cover $c^{13}$ is lowered the reservoir may be freely turned, but when the cover $c^{13}$ is raised the arm $c^{130}$ lies between the lug $a^{20}$ and the position of the notch $a^2$, and the reservoir cannot be turned so as to permit the lug to register with the notch in the cover $b^{10}$, and consequently the reservoir A can be withdrawn only when the cover $c^{13}$ is lowered, the cap $e$ is raised, and the inflow of air into the casings B and C is thereby cut off, and outflow through the perforations $c'$ is stopped.

This device is adapted for the use of gasolene and other similar hydrocarbon oils. The reservoir A is suitably filled and is inserted in place, thereby opening the valve $a'$ in the reservoir and permitting oil to flow into the lower part of the casing C. Then the thumb-screw C' is turned, removing the cap E from the perforations $c^2$ and raising the cover $c^{13}$ from the perforations $b^{11}$. The evaporation of the gasolene begins from its surface and in addition the sheet of absorbent D takes up the gasolene like a wick, distributes it over a considerable surface, and increases the evaporation of the fluid into the casing C. Air flows in through the perforations $b^{11}$ and mixes with the vapor inside the casing C, and the air mixes freely with the vapor. The vapor being heavier than air, flows through the perforations $c'$ and drags with it the air which has been flowing in through the perforations $b^{11}$, so that the outflow through said perforations is a mixture of air and gasolene-vapor. At this point the mixture is so highly charged with gasolene that if the mixture were burned it would produce a yellow flame, showing incomplete combustion; but the spraying of the mixture of air and vapor through the fine perforations $c'$ into a fresh body of air permits a second aeration of the mixture and the addition of more oxygen of the air thereto. The air permitting this second aeration comes through the perforations $b^{11}$ and down outside the casing C and between it and the casing B. The highly-aerated mixture is still heavy enough to pass by gravity down the tube B' and to the burner $b'$, and at this point it will be found that the flame is blue, showing a substantially complete combustion. On account of the free evaporation of the gasolene in the casing C and the free admission of air thereto, (for the inlet perforations $b''$ are large enough to supply all the air that can be had through the pipe B',) the mixed air and vapor inside the casing C are what may properly be called a "saturated" mixture, which flows out through the fine perforations $c'$. It will be noticed that evaporation occurs from both the inner and the outer surfaces of the absorbent D and that the perforations $d$ permit the mixed vapor and air inside of the sheet D to flow outward in order to pass through the perforations $c'$. The saturated mixture in the casing C is reaerated, or reduced in its proportion of gasolene, by the air outside of the casing C, which meets the spray flowing through the perforations $c'$.

In Figs. 3 to 6 is shown a modified form of the device embodying my invention, which is the preferred form. A is the same student-lamp reservoir as in the form shown in Figs. 1 and 2. A is the outlet-tube therefrom, and $a^2$ is the stem of the same valve $a'$ shown in Fig. 7. In this form of device the outer casing G has an annular top G', upon the inner edge of which the reservoir A rests. The top G' has a series of air-inlet perforations $g'$, which may be covered with wire-gauze, if desired. An annular cover $G^2$ is hinged to the casing G, so as to cover all the perforations $g'$ when lowered and to open them when raised. The outer casing G has a tight bottom $g$ extending entirely across it. Upon this bottom rests a series of cylindrical vertical absorbent sheets H of the same character as the sheet D described in relation to the former device and which may be supported and protected by wire-netting $h$. By this arrangement I am enabled to secure the maximum radiating-surface. The wire-netting, preferably corrugated, as shown in Fig. 5, retains the sheets well apart and at the same time exposes them freely to the air. Through the bottom $g$ extends a tube J upward and to a point above the level at which the fluid gasolene may stand in said casing G. As shown in the drawings and for the purpose of avoiding the bottom of the reservoir A, the tube J is set to one side and within a recess made in the absorbent sheets. A cock $j$ opens or cuts off the flow of vapor downward through the tube J, and said cock is connected by a link $g^2$ with the cover $C^2$ near to its hinge $g^0$. As shown in the drawings, said link is fixed eccentrically to the cock $j$, so that when the handle J' is turned and the cock is closed the cover $C^2$ is lowered, but when the handle J' is turned and the cock $j$ is opened the cover $G^2$ is raised. Consequently the same movement of the handle J' cuts off the outflow of vapor from the casing G through the pipe J and at the same time shuts the air-inlets $g'$ into said casing. Under the bottom $g$ and in a downward extension of the casing C are a series of air-inlet holes $g^{10}$, so that vapor flowing downward through the pipe J may be mixed with a fresh supply of air coming in through the holes $g^{10}$. Below the level of said holes is placed a box K, of any suitable form, but having around its sides a number of fine perforations $k$, so that the vapor flowing into said box is discharged or sprayed outward therefrom through the perforations $k$ in order to be mixed with the air flowing inward through the holes $g^{10}$. The box K is placed below the level of said holes, because the mixed gasolene and air is heavier than air alone and tends to fall downward and does not tend to rise and flow outward through the holes $g^{10}$. The downward extension $G^{10}$ of the casing G, underneath the bottom $g$, is extended to meet the pipe B', leading to the burner. In this form of this invention there is a greater evaporating-surface by reason of the multiplication of the absorbent sheets H. The casing G, above the bottom $g$, is a mixer for air and gasolene vapor, and the tube J is a connection between the mixer and the casing below the bottom. It is obvious that the casing G, above the bottom $g$, may be a separate vessel from the casing below the bottom, provided there is a connecting-tube between them, and the casing below the bottom is a mixing-chamber. In both forms of my device the first mixture of air and vapor is reaerated in its passage from the mixer to the burner.

In order to prevent the reservoir A from being lifted out from the casing G until the cover $G^2$ is closed upon the inlet-holes $g'$, the following mechanism is provided. An arm $g^{20}$ is attached to the under side of the cover $G^2$ and is curved in an arc whose center is the pivotal point of the hinge $g^0$. The lower portion of this arm is U-shaped in cross-section, as shown in Fig. 6, and at its upper part the sides of the U are cut away, as at $g^2$, Fig. 3. Upon the reservoir A is a lug $a^{10}$, adapted, when the reservoir is in position and the reservoir is slightly turned, to come under the inner edge of the top G' of the casing G. The lug is also of such width that it cannot enter the recess in the U-shaped portion of the arm $g^{20}$. If the cover $G^2$ is down, the reservoir A may be inserted, and then the lug $A^{10}$ will rest over the upper edges of the sides of the U-shaped portion of the arm $g^{20}$, and upon turning the reservoir slightly the lug comes under the edge of the top G', as shown in Figs. 4 and 6, and will stay on one side of the arm $g^{20}$. The reservoir cannot be turned if the arm is raised so as to bring the U-shaped portion in the path of rotation of the arm $a^{10}$. When the cover $G^2$ is closed, however, the lug $a^{10}$ passes above the sides of the U-shaped part of the arm $g^{20}$ and the reservoir may be removed.

In the form of device last described the reservoir is supposed to have been removed and the cover $G^2$ and the cock $j$ to have been closed. The reservoir A is now inserted and is turned slightly, so that the lug $a^{10}$ lies under the edge of the top G' of the reservoir G. The lifting of the valve by reason of the stem $a^2$ striking the bottom $g$ of the casing G permits oil to flow out from the reservoir until the proper height thereof in the casing G is reached. The absorbent sheets H take up the oil throughout their whole surfaces and evaporation occurs from their surfaces and from the surface of the fluid in the bottom of the casing. If the handle J' is turned, the cock $j$ is opened and the cover $G^2$ is raised. The reservoir now cannot be removed. Air now flows in through the holes $g'$, mixes with the gasolene-vapor in the casing G, and the mixed air and vapor pass downward through the tube J into the box K, and is then sprayed outward through the perforations $k$ in the edge of the box. A new supply of air passes in through the holes $g^{10}$ and mixes with the saturated mixture of air and gas which comes out of the box K, adding oxygen to the mixture and in sufficient quantity to produce a blue flame when the mixture is burned.

In both forms of my invention it will be noticed that the saturated mixture is aerated after it leaves the mixing vessel, and it is obvious that other devices than those shown may be employed which will so admit air to the mixture in its passage from the mixer to the burner that it will become so thoroughly aerated as to burn with a blue flame. In both these forms of my invention it will be noticed that the flow of vapor is produced entirely by gravity and that there is no other force employed to conduct the gas to the burner.

In the form of my device shown in Figs. 3 and 5 the wire-netting of the perforated sheet metal supporting the sheets of absorbent is corrugated, as clearly shown in Fig. 5, in order to permit free circulation of air between the sheets and to support them in proper relation to each other. The wire-netting $h$ is of large mesh, as shown in Fig. 3.

It is clear that the operation of the circle of perforations $g^{10}$ and the perforations $k$ of the box K may be said to be either a spraying of the vapor into air or a spraying of air into the vapor, and my invention covers either mode of mixing air and vapor together.

What I claim is—

1. The combination of a mixer for hydrocarbon vapor and air, a casing connected with the mixer, an air-inlet into the casing, and means within the casing for producing a second mixing of the first mixture and a second supply of air, a burner, and a conduit connecting said casing with the burner, descending as it leaves said casing, whereby the passage of the mixed air and gas from said casing automatically draws in an additional supply of air through said air-inlet, substantially as described.

2. The combination of a mixing vessel adapted to vaporize fluid hydrocarbon and having an air-inlet, a casing connected with the mixing vessel, an air-inlet into the casing, a spraying device for conducting the mixed air and vapor into said casing, a burner, and a conduit connecting said casing with the burner, descending as it leaves said casing, whereby the passage of the mixed air and gas from said casing automatically draws in an additional supply of air through said air-inlet, substantially as described.

3. In a carbureting-lamp, the combination of an evaporating vessel, air-inlet to said evaporating vessel, a suitable burner below the level of said vessel, a conduit for the gas leading from said evaporating vessel to said burner, and means for mixing an independent supply of air with the gas in its passage through said conduit, substantially as described.

4. In a carbureting-lamp, the combination of an evaporating vessel, a sheet of absorbent material supported in said evaporating vessel and partially immersed in the fluid therein, air-inlet to said evaporating vessel, a suitable burner below the level of said vessel, a conduit for the gas leading from said evaporating vessel to said burner, and means for mixing an independent supply of air with the gas in its passage through said conduit, substantially as described.

5. In a carbureting-lamp, the combination of an evaporating vessel, air-inlet to said evaporating vessel, a suitable burner below the level of said vessel, a conduit from said evaporating vessel to said burner, means for mixing air with the gas in its passage through said conduit, a valve in said conduit, means for closing said air-inlet and connection therefrom to said valve, whereby air is admitted or shut off from the evaporating vessel as the said valve is opened or closed respectively, substantially as described.

6. In a carbureting-lamp, the combination of an evaporating vessel, a series of partially-immersed sheets of absorbent material so supported in said evaporating vessel as to permit the circulation of air between their unimmersed surfaces, means for controlling the admission of air to said evaporating vessel, a suitable burner below the level of said vessel, a conduit from said evaporating vessel to said burner adapted to convey gas to said burner by gravity, and means for mixing a second supply of air with the gas in its passage through said conduit, substantially as described.

7. In a carbureting-lamp, the combination of an evaporating vessel, a series of partially-immersed sheets of absorbent material so supported in said evaporating vessel as to permit the circulation of air between their unimmersed surfaces, air-inlet to said evaporating vessel, a suitable burner below the level of the vessel, a conduit from said evaporating vessel to said burner adapted to convey gas by gravity to said burner, means for mixing independently a second supply of air with the gas in its passage through said conduit, a valve in said conduit, means for closing said air-inlet and connection therefrom to said valve, whereby air is admitted to or shut off from the evaporating vessel as the said valve is opened or closed respectively, substantially as described.

8. In a carbureting-lamp, the combination of an evaporating vessel, means for controlling the admission of air to said evaporating vessel, a mixing-chamber below said evaporating vessel, means for independently supplying a second supply of air to said mixing-chamber, a suitable burner below the level of the chamber, and a pipe leading from said mixing-chamber to said burner through which gas may pass by gravity to said burner, substantially as described.

9. In a carbureting-lamp, the combination of an evaporating vessel, air-inlet to said evaporating vessel, a mixing-chamber below said evaporating vessel, a perforated box for diffusing gas through said mixing-chamber, a conduit from said evaporating vessel to said perforated box, means for supplying air to said mixing-chamber, a suitable burner below the level of said chamber, and a pipe leading from said mixing-chamber to said burner 10. In a carbureting-lamp, the combination of an evaporating vessel, air-inlet to said evaporating vessel, a mixing-chamber below said evaporating vessel, a perforated box for diffusing gas through said mixing-chamber, means for supplying air to said mixing-chamber, a conduit from said evaporating vessel to said perforated box, a valve in said conduit, means for closing said air-inlet and connection therefrom to said valve, whereby air is admitted or shut off from said evaporating vessel as the said valve is opened or closed respectively, a suitable burner below the level of said chamber, and a pipe from said mixing-chamber to said burner through which gas is conveyed by gravity to said burner, substantially as described.

11. The combination of a mixer for hydrocarbon vapor and air, a casing connected with the mixer, an air-inlet into the casing, means within the casing for producing a second mixing of the first mixture, and means for controlling said second mixing, a burner, and a conduit connecting said casing with the burner, descending as it leaves said casing, whereby the passage of the mixed air and gas from said casing automatically draws in an additional supply of air through said air-inlet, substantially as described.

12. In a carbureting-lamp, the combination of an evaporating vessel, air-inlet to said evaporating vessel, a suitable burner below the level of said vessel, a conduit from said evaporating vessel to said burner, means for mixing air with the gas in its passage through said conduit, and means for controlling such mixing, substantially as described.

13. In a carbureting-lamp, the combination of an evaporating vessel, a series of partially-immersed sheets of absorbent material so supported in said evaporating vessel as to permit the circulation of air between their unimmersed surfaces, means for controlling the admission of air to said evaporating vessel, a suitable burner below the level of said vessel, a conduit from said evaporating vessel to said burner adapted to convey gas to said burner by gravity, means for mixing a second supply of air with the gas in its passage through said conduit, and means for controlling said mixing, substantially as described.

14. In a carbureting-lamp, the combination of an evaporating vessel, air-inlet to said evaporating vessel, a mixing-chamber below said evaporating-chamber, a perforated box for diffusing gas through said mixing-chamber, a conduit from said evaporating vessel to said perforated box, means for supplying air to said mixing-chamber, means for controlling the mixing of air and gas in said mixing-chamber, a suitable burner below the level of said chamber, and a pipe leading from said mixing-chamber to said burner through which gas is conveyed by gravity to said burner, substantially as described.

WALTER S. STROWGER.

Witnesses:
C. M. PERKINS,
F. BISSELL.